United States Patent
Konishi et al.

[11] Patent Number: 5,867,467
[45] Date of Patent: Feb. 2, 1999

[54] PACKAGE RELAY TERMINAL ASSEMBLY

[75] Inventors: Akio Konishi, Sanda; Koichiro Hirabayashi, Hirakata; Takefumi Yanagihara, Saijo; Yoshihiro Fujimoto, Neyagawa, all of Japan

[73] Assignee: Matsushita Electric Industrial Co., Ltd., Japan

[21] Appl. No.: 682,961

[22] Filed: Jul. 18, 1996

[30] Foreign Application Priority Data

Jul. 19, 1995 [JP] Japan .................................. 7-182482

[51] Int. Cl.$^6$ ........................... G11B 33/02; G11B 5/008
[52] U.S. Cl. ............................................. 369/75.1; 360/94
[58] Field of Search .................................. 369/75.1, 75.2, 369/77.1–77.2, 291–292; 360/132, 133, 94, 60

[56] References Cited

U.S. PATENT DOCUMENTS

| | | | |
|---|---|---|---|
| 4,743,984 | 5/1988 | Ryan | 360/60 |
| 4,891,727 | 1/1990 | Sato et al. | 369/292 |
| 5,291,346 | 3/1994 | Baekgaard | 360/60 |
| 5,390,870 | 2/1995 | Sawada et al. | 360/94 |
| 5,506,736 | 4/1996 | Ota | 360/94 |

*Primary Examiner*—Allen T. Cao
*Attorney, Agent, or Firm*—Parkhurst & Wendel

[57] ABSTRACT

A package relay terminal assembly of the present invention not only electrically conducts to exterior connection terminals (101) of an electric circuit housed in a record package (100) but also is intended to guide and position the record package within a recording and reproducing device during recording and reproduction, and ensure reliable setting of the record package in place. To this end, the package relay terminal assembly of the present invention has L-shaped terminal strips (1) corresponding in number to the exterior connection terminals (101) of the record package (100), the terminal strips (1) being arranged side by side on a terminal wall (2a). And the terminal wall (2a) is provided with a base block (2b) and a guide wall (2c).

17 Claims, 9 Drawing Sheets

PACKAGE RELAY TERMINAL ASSEMBLY

FIELD OF THE INVENTION

The present invention relates to a package relay terminal assembly which is used in a recording and reproducing device for recording and reproducing data in and from a record package having an electric circuit and a recording medium for magnetic or optical recording and reproduction and which functions to relay connection between said electric circuit and another circuit.

BACKGROUND OF THE INVENTION

In recent years, the characteristics of recording mediums for magnetic or optical recording and reproduction have been remarkably improved. For example, in the case of a magnetic videotape, there are various types as to the thickness of the tape (whether it is for short-time recording or long-time recording), the kind of the tape (whether it is so-called ME or MP), the grade of the tape (whether it is for high density recording or highly durable), allowing the user to enjoy himself by making different selections. When the data stored in such recording medium is reproduced by a recording and reproducing device, a technique has heretofore been often used to allow the recording and reproducing device to automatically discriminate the kind. As for such technique, it is often practiced to form detection holes in the package of the recording medium while allowing the recording and reproducing device to detect them. Such examples include detection holes in the chrome tape or metal tape of Compact Cassette (registered trademark) for audio, and detection holes in super VHS (registered trademark, S-VHS). Further, in order to prevent the data stored in a recording medium from being inadvertently erased or prevent the recording medium from being used for "superimposed" recording by mistake, a compact cassette or VHS tape is provided with a lug for erase prevention (as is known, if the lug is broken away, a hole is made), and Microfloppy Disk (registered trademark) or the like uses slide type record detecting means (a combination of a hole and a slide cover).

As is known in the art, as means for detecting such holes in a record package, a switch is employed which is adapted to turn on and off according to the presence or absence of such hole. Sometimes, a photoelectric element is used for detecting a hole (presence of a hole allows light to be received and absence of a hole cuts off light).

However, such detecting method using a blind hole or through-hole is limited in that one such hole can set or identify only two items of information, so that as the number of items to be set increases, the number of blind holes or through-holes increase. Thus, recently there has been proposed electrical setting means which is capable of handling more information. That is, an electric circuit having exterior connection terminals is provided in a record package, so that when the data stored in the latter is reproduced by a recording and reproducing device, said electric circuit is connected through the exterior connection terminals to detect the contained information. To this end, it has become necessary to provide a package relay terminal assembly adapted to conduct to the exterior connection terminals when such record package is used for recording or reproduction.

DISCLOSURE OF THE INVENTION

According to the present invention, which has solved the above problem, when the data stored in a record package is to be reproduced by a recording and reproducing device, the package relay terminal assembly of the present invention not only reliably conducts to the exterior connection terminals but also makes positioning thereof more reliable in that it guides the record package, using conventional detecting means using holes. The invention is intended to provide such package relay terminal assembly.

To achieve this object, a package relay terminal assembly according to the invention comprises at least two terminal strips which are electrically conductive and which conduct to the exterior connection terminals of the record package, a terminal wall having said terminal strips installed thereon, a base block projecting at right angles from the lower end edge of said terminal wall, and a guide wall disposed on the end edges of said terminal wall and base block.

Further, a package relay terminal assembly according to the invention includes a switch installed on the base block, the front end of the switch pin of said switch projecting out of the base block.

Further, according to a package relay terminal assembly, terminal strips are bent in L-shape, said terminal strips being disposed in parallel with the base block and on the terminal wall, one of said terminal strips being a main terminal strip which has a bending place located farther away from the base block than the bending places of the other terminal strips.

The main terminal strip of a package relay terminal according to the invention has a greater area of contact with the exterior connection terminal than the other terminal strips.

In a package relay terminal assembly according to the invention, the main terminal strip and the signal terminal of one of the switches disposed on the base block conduct to each other.

In a package relay terminal assembly according to the invention, at least one retaining hole for receiving a projection disposed on the chassis of the recording and reproducing device to position the record package is formed in the base block or in a positioning portion installed on the base block.

In a package relay terminal assembly according to the invention, at least one projection adapted to fit in at least one positioning hole in the bottom surface of the record package is provided in the base block or in a positioning portion installed on the base block.

In a package relay terminal assembly according to the invention, when the package relay terminal assembly is attached to the chassis of the recording and reproducing device, the bottom surface of the chassis is substantially flush with the bottom surface of the base block.

With the arrangement thus made, when a record package is set in place in a recording and reproducing device, the exterior connection terminals of the record package and the terminals strips of the package relay terminal assembly conduct to each other and furthermore the terminal wall and guide wall erected on the base block guides the recording and reproducing device for its lifting and lowering movement, whereby the positioning of the record package can be smoothly effected.

Further, the guide wall prevents damage to the terminal wall liable to occur due to the reaction from the terminal strips pressed against the exterior connection terminals during the positioning of the record package.

Further a switch is provided on the base block and since the front end of the switch pin of said switch projects through the base block, said switch detects the presence or absence of the setting hole in the record package.

Further, one of the terminal strips is a main terminal strip which has a bending place located farther away from the base block than the bending places of the other terminal strips, with the result that during the lowering of the record package, the main terminal strip conducts to the exterior connection terminal than do the other terminals and conduction becomes reliable.

Further, since the main terminal strip and the signal terminal of one of the switches installed on the base block conduct to each other, a smaller number of connections to the control circuit block suffices.

When the package relay terminal assembly is attached to the chassis of the recording and reproducing device, the bottom surface of the chassis and the bottom surface of the base block are substantially flush with each other, thereby making it easier to fix the package relay terminal assembly to the chassis. The signal terminals led out through the bottom of the base block may be directly soldered to the circuit board installed on the underside of the chassis.

Since the projection on the chassis restricts the position of the package relay terminal assembly, the force with which the terminal strips press the exterior connection terminals during setting the record package in place is stronger and hence conduction is more reliable.

EMBODIMENTS

A first embodiment of the present invention will now be described with reference to the drawings.

Figure 1:
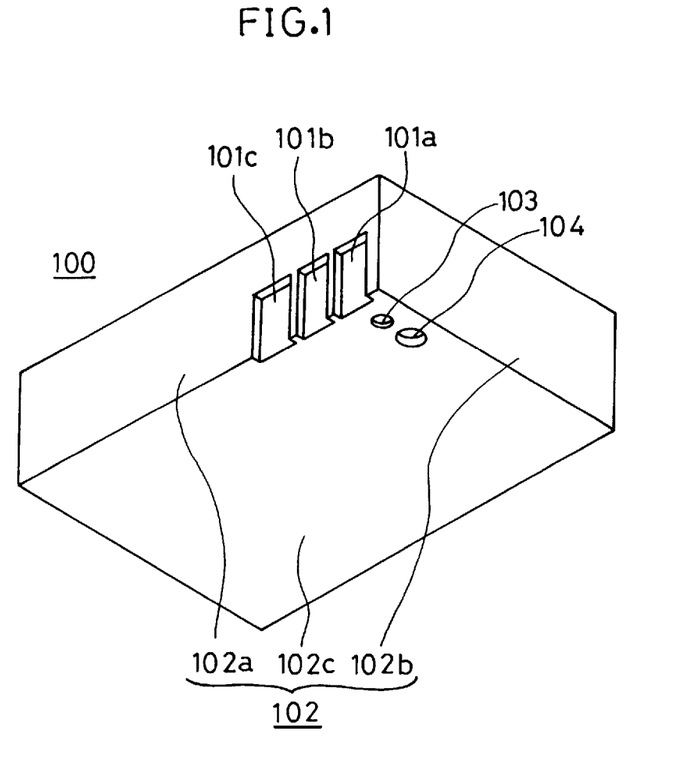
FIG. 1 is a perspective view of a record package, seen from its bottom.
Figure 2:
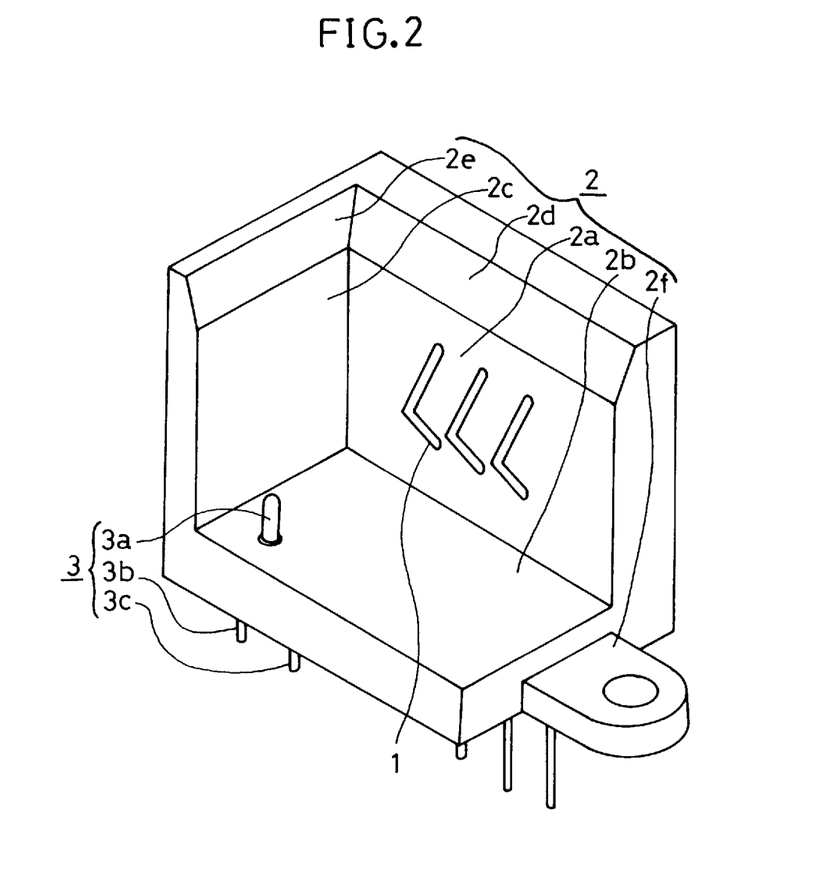
FIG. 2 is a perspective view of a package relay terminal assembly according to a first embodiment of the invention.
Figure 3:
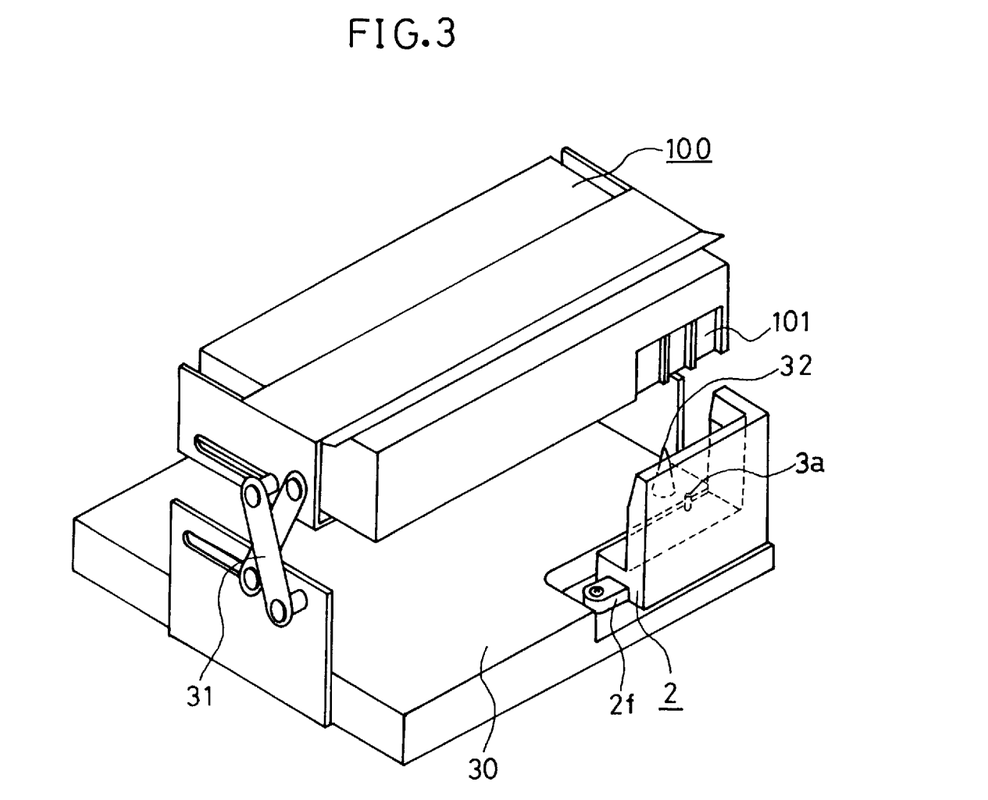
FIG. 3 is a perspective view showing how the record package is lifted and lowered in a recording and reproducing device having the package relay terminal assembly attached thereto.
Figure 4:
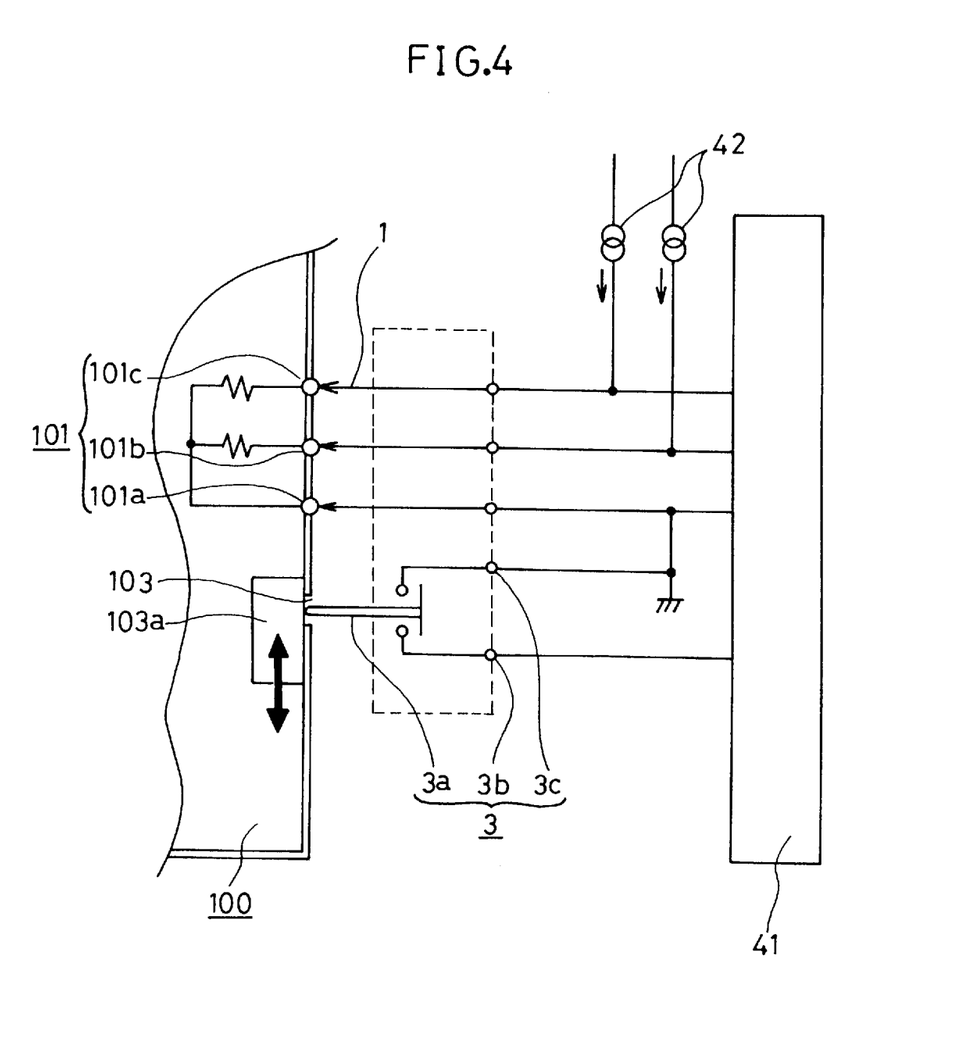
FIG. 4 is a circuit diagram showing how the package relay terminal assembly is connected.

FIG. 1 is a perspective view of a record package, recently proposed, having a magnetic tape, which is a recording medium, and an electric circuit; FIG. 2 is a perspective view of a package relay terminal assembly in the first embodiment of the invention; FIG. 4 is a perspective view showing how the record package is lifted and lowered in a recording and reproducing device having the package relay terminal assembly of the present embodiment attached thereto; and FIG. 4 is a circuit diagram with the package relay terminal assembly attached to the circuit.

In the drawings, the numeral 100 denotes a record package with a magnetic tape wound on a reel housed therein, and the magnetic tape exposed through an opening in one side is protected by a package cover (the reel, magnetic tape, and package cover not shown). The numeral 102 denotes a package body of synthetic resin. The numeral 101 denotes exterior connection terminals in the form of three metal electrodes connected to an electric circuit (not shown) installed in the record package 100. The exterior connection terminals 101 comprise a main exterior connection terminal 101a closest to the corner and auxiliary exterior connection terminals 101b, 101c, and depending on the values of the resistors between the terminals, setting is made as shown in Table 1.

TABLE 1

|  | | Resistance value with respect to main exterior connection terminal 101a | | |
|---|---|---|---|---|
|  | Setting | <15kΩ | 22KΩ< <47KΩ | 50KΩ< |
| auxiliary exterior connection terminal 101b | tape thickness | thin | not set | thick |
| auxiliary exterior connection terminal 101c | tape grade | common use | business use (broadcasting station) | computer |
| main exterior connection terminal 101a | | ground (GND), common terminal | | |

The numeral 103 denotes a setting hole as described in the prior art example. This setting hole 103 is formed in a bottom surface 102c and is opened and closed by a setting door 103a in the record package 100. The numeral 104 denotes a positioning hole likewise formed in the bottom surface 10. This positioning hole 104 serves as a criterion for positioning when the record package 102 is set in place in the recording and reproducing device; usually, three or four such positioning holes are provided (Herein is shown only one located near the exterior connection terminals 101, the others being omitted from illustration.) In FIG. 2, the numeral 2 denotes a terminal body of synthetic resin, comprising a base block 2b, a terminal walls 2a and 2c erected on the outer periphery of the base block 2b. Denoted by 2d and 2e are chamfered portions. A fixed portion 2f is connected to the chassis of the recording and reproducing device by screws, whereby the package relay terminal assembly is fixed in place. The numeral 1 denotes terminal strips of electrically conductive metal, three such terminal strips being provided on the terminal wall 2a, connected to conductors on the bottom surface of the base block 2b as they extend through the base block terminal wall 2a and base block 2b. When the record package is set in place in the recording and reproducing device, the terminal strips 1 contact the exterior connection terminals in one to one correspondence, to take out signals from the record package 100. The numeral 3 denotes a first switch, which is a so-called momentary type normally closed switch with a switch pin 3a substantially vertically projecting through a hole formed in the base block 2b, said switch being designed such that unless the switch pin 3a is depressed, switch signal terminal 3b, 3c are conducting but when it is depressed, the switch signal terminals 3b, 3c are cut off.

The operation of the package relay terminal assembly constructed in the manner described above will now be described with reference to FIGS. 1 through 4. First, the record package 100 is lowered, as it is lightly held, by the lifting mechanism 31 of the recording and reproducing device, until it is set in place on the chassis 30. At this time, the record package 100 is lowered as the front surface 102a and side surface 102b are guided by the guide wall 2c. A positioning projection (taper pin 32) is inserted in a positioning hole 104 in the record package 100, whereby the record package 100 has its position restricted and is fixed on the chassis 30. Further, since the middle stage of the lowering movement, the terminal strips 1 have come into contact with the respective connection terminals 101 for electrical conduction. In this case also, the terminal strips 1 press the exterior connection terminals 101, and hence the reaction acts on the terminal wall 2a; however, since the guide wall 2c supports the terminal wall 2a, there is no possibility of the terminal wall 2a being bent, thus avoiding imperfect contact between the terminal strips 1 and the exterior connection terminals 101.

Likewise, the setting door 103 closing the setting hole 103 in the record package 100 pushes the switch pin 3a of the first switch 3. The first switch 3 is a normally closed switch. Therefore, since the setting hole 103 is closed by the setting door 103a as shown in FIG. 4, when the first switch 3 collides with the setting door 103a, the current is cut off. At this time, the setting detection circuit 41 of the control circuit block detects the circuit being opened.

Further, when the terminal strips 1 and the exterior connection terminals 101 conduct to each other, a given current from a constant current source 42 in the control circuit block flows to the resistors between the main exterior connection terminal 101a and the auxiliary exterior connection terminals 101b, c, the resulting voltage drops being detected by the setting detection circuit 41 to find the resistance values and hence the contents of the tape shown in Table 1 can be known.

As described above, according to the first embodiment of the invention, the terminal body 2 has at least two terminal strips 1 for conduction to the exterior connection terminals 101 of the electric circuit of the record package, the terminal wall 2a having said terminal strips 1 attached thereto, the base block 2b extending at right angles from the lower end edge of the terminal wall 2a, and the guide wall 2c disposed on the end edges of the terminal wall 2a and base block 2b. The base block 2b is provided with the switch 3 adapted to be actuated in that the bar-like switch pin 3a is pushed. And when the record package 100 is set in place, connection is made between the exterior connection terminals 101 of the electric circuit of the record package and the terminal strips 1. The positioning of the record package 100 is effected in that the record package 100 is guided by the terminal wall 2a and guide wall 2c erected on the outer peripheral edge of the base block 2b. Further, the guide wall 2c prevents damage to the terminal wall 2a liable to occur due to the reaction from the terminal strips 1 pressed against the exterior connection terminals 101 during the positioning of the record package 100. The switch 3 for detecting the setting hole 103 in the record package 100 may be installed on the base block 2b.

Figure 5:
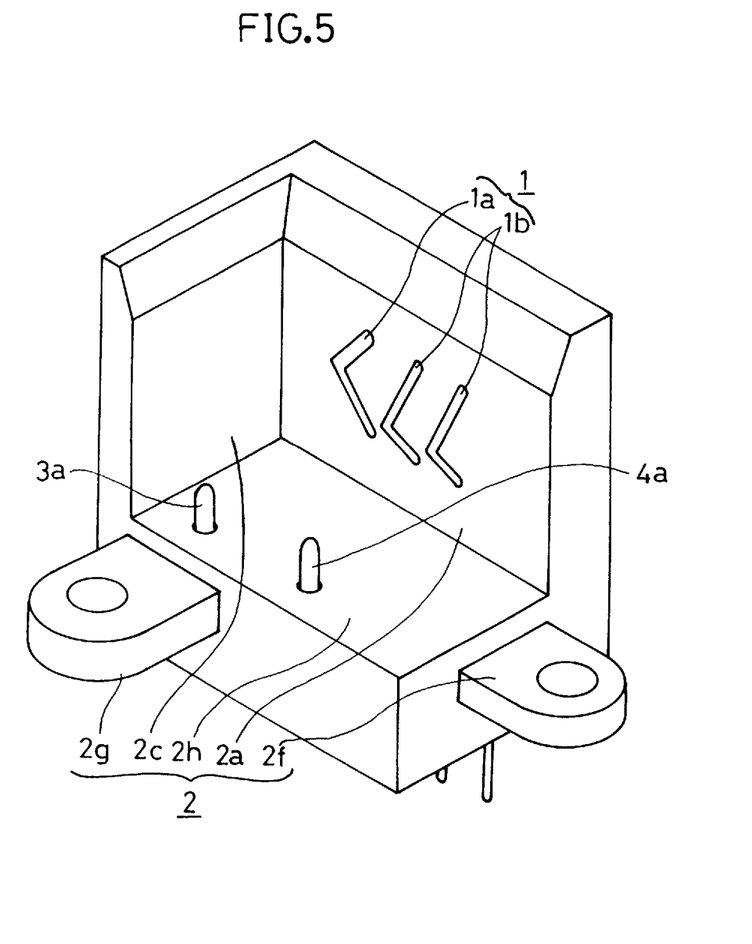
FIG. 5 is a perspective view of a package relay terminal assembly according to a second embodiment of the invention.
Figure 6:
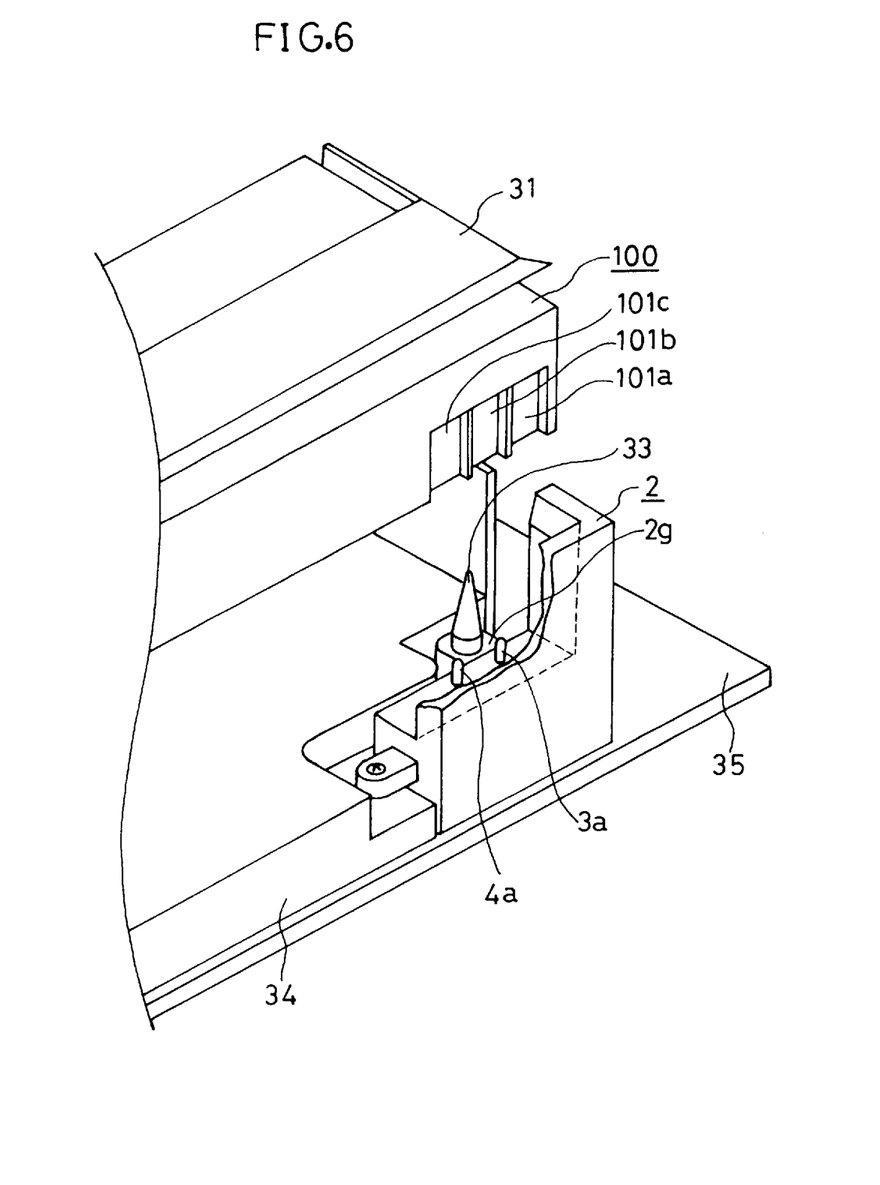
FIG. 6 is a partial perspective view showing how the record package is lifted and lowered in a recording and reproducing device having the package relay terminal assembly attached thereto.
Figure 7:
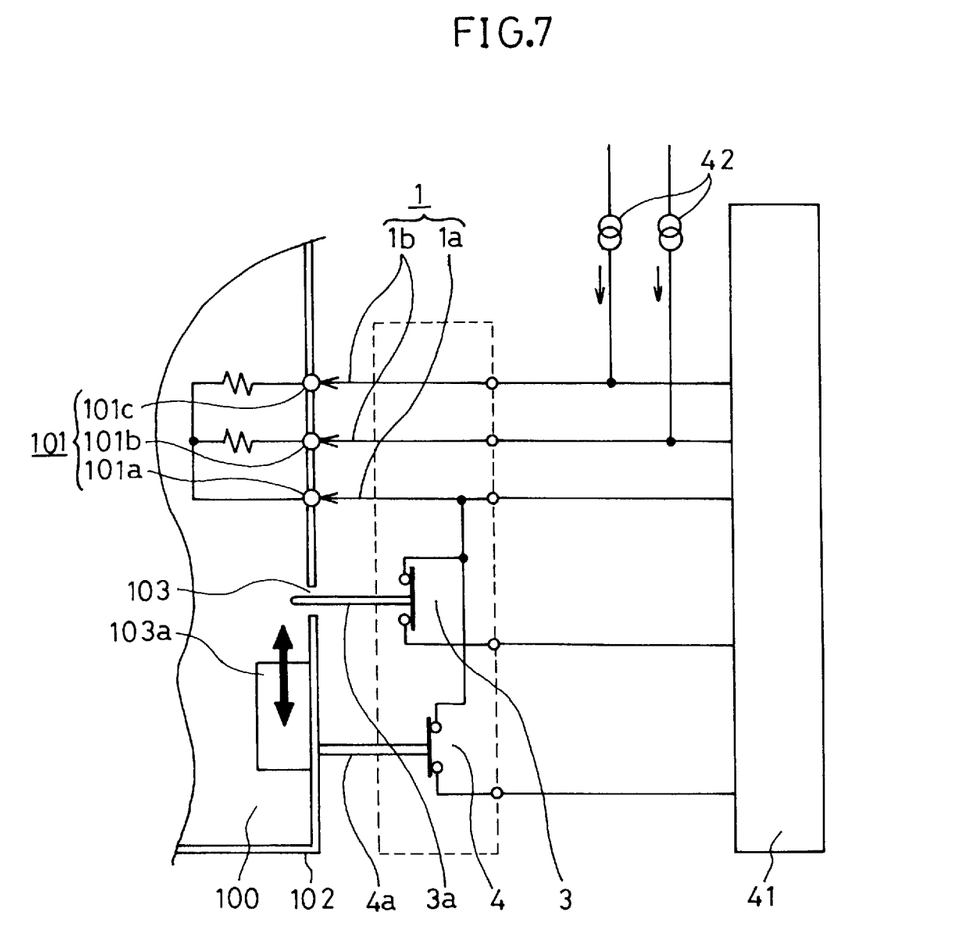
FIG. 7 is a circuit diagram showing how the package relay terminal assembly is connected.

A second embodiment will now be described with reference to the drawings. FIG. 5 is a perspective view of a package relay terminal assembly according to the second embodiment, and FIGS. 6 and 7 are a partial perspective view, partly broken away, and a circuit diagram, showing the situation when the record package is is set place in a recording and reproducing device having this package relay terminal assembly.

In FIGS. 5 through 7, 1a denotes a main terminal strip which, like auxiliary terminal strips 1b, is in the form of a metal strip bent in substantially L-shape, these terminal strips being arranged side by side with each other on the terminal wall 2a. What this main terminal strip 1a differs from that in the first embodiment is that its bending place is located above the level of the bending places of the auxiliary terminal strips 1b and that it is a flat metal plate larger in contact area than the other terminal strips. Denoted by 2h is a base block and, as in the first embodiment, the terminal wall 2a and guide wall 2c are erected on the outer peripheral edge. The thickness of the base block 2h is substantially the same as that of the chassis 34 of the recording and reproducing device. A positioning portion 2g is either flush with the upper surface of the base block 2h or differs in level therefrom, and it projects from the side of the base block and has a hole formed therein to receive a taper pin 33 on the chassis 34 of the recording and reproducing device. The numeral 4 denotes a second switch and 4a denotes s switch pin. The second switch is a normally open type adapted to conduct when the switch pin 4a is pushed, and one of the terminals of said switch, together with one of the terminals of the first switch 3, is electrically connected to the main terminal strip 1a. The rest of the arrangement is the same as in the arrangement of the first embodiment shown in FIG. 1.

Referring to the thus arranged package relay terminal assembly of the second embodiment, how to assemble it on the chassis and how it operates will now be described. First, referring to the assembling operation, after the taper pin 33 on the chassis 34 has been inserted from below into the hole in the positioning portion as shown in FIG. 6, the fixing portion 2f is fixed to the chassis 34 by a screw. Thereby, the positioning of the package relay terminal assembly can be effected accurately and the assembling operation thereof becomes easy. And when the record package is set in place, the joining thereof to the package relay terminal assembly becomes stronger.

Further, the thickness of the base block 2h of the package relay terminal assembly of the present embodiment is designed to be substantially the same as that of the bottom of the chassis 34, it follows that, like the terminals such as those of the motor (not shown) and the sensor (not shown) installed on the chassis 34, the signal terminals projecting from the bottom of the base block 2h can be soldered directly to a circuit board 35 installed under the chassis 34. Further, in the present embodiment, as shown in FIG. 7, since the one of the respective terminals of the first and second switches 3 and 4 is electrically connected to the main terminal strip 1a within the package relay terminal assembly, the number of soldering points to the circuit board is as small as 5, which is the same number as in the first embodiment.

The operation will now be described. As in the first embodiment, the record package 100 is lowered, as it is lightly held, by the lifting mechanism 31 of the recording and reproducing device, until it is set in place on the chassis 34. At this time, the front surface 102a and side surface 102b of the record package 100 are guided by the chamfered portions 2d, 2e, terminal wall 2a and guide wall 2c. In this manner, the positioning taper pin 33 is inserted in the positioning hole 104 in the record package 100, whereby the record package 100 has its position restricted and is set in place on the chassis 34. Further, since the middle stage of the lowering movement, first, the main terminal strip 1a presses the main exterior connection terminal 101a for electrical conduction. Then, the auxiliary terminal strips 1b connect to the auxiliary exterior terminals 101b, 101c. As in the case of the first embodiment, since the guide wall 2c supports the terminal wall 2a, there is no possibility of the terminal wall 2a being bent, thus avoiding imperfect contact between the terminal strips 1 and the exterior connection terminals 101. Further, since the main terminal strip 1a has its bending place located above the level of the bending places of the auxiliary terminal strips 1b, first the main terminal strip 1a conducts to the main exterior terminal 101a, so that electrical reliability is improved. Further, the main terminal strip 1a has a greater area of contact than the other terminal strips 1b, providing improved electrical conduction.

Further, when the record package 100 is set in place on the chassis 34, the bottom surface 102c of the record package 100 depresses the switch pin 4a of the second switch 4. At the same time, as in the case of the first embodiment, the first switch 3 detects the setting to the opening/closing of the setting hole 103 formed in the record package 100. As shown in FIG. 7, since the switch 3 is of the normally closed type, when the setting hole 103 is open, the switch 3 is closed and the setting detection circuit 41 detects the circuit being closed. Since the second switch 4 is of the normally open type, when the record package 100 is set in place on the chassis 34, the second switch 2 closes and the setting detection switch 41 detects the circuit being closed.

Further, when the terminal strips 1 and the exterior connection terminals 101 conduct to each other, a given current from a constant current source 42 flows to the resistors between the main exterior connection terminal 101a and the other exterior connection terminals 101b, c, the resulting voltage drops being detected by the setting detection circuit 41 to find the resistance values and hence the contents of the tape shown in Table 1 can be known.

As described above, the second embodiment, in addition to the arrangement of the first embodiment, has the terminal strips bent in L-shape, said strips being at least two in number and arranged side by side with each other substantially in parallel with the base block and on the end wall, the bending place of the main terminal strip being located above the level of the bending places of the other terminal strips. Furthermore, the area of contact between the main terminal strip 1a and the exterior connection terminal of the record package is larger than that of the other terminal strips and the auxiliary exterior connection terminals 101b, 101c. Therefore, during the lowering of the record package 100, the main terminal strip 1a conducts to the exterior connection terminals 101 earlier than do the other terminals 1b and the resulting conduction is more reliable. Further, one of the respective terminals of the first and second switches 3 and 4 conducts to the main terminal strip 1a, a smaller number of connections to the control circuit block suffices. Further, since the positioning portion having at least one holding hole for receiving the taper pin 3 on the chassis of the recording and reproducing device is integral with the base block, it is easier to fix the package relay terminal assembly to the chassis. And since the position of the package relay terminal assembly is restricted by the taper pin 33, the force with which the terminal strips 1 press the exterior connection terminals 101 when the record package is set in place on the chassis, is increased and conduction becomes more reliable. Further, since the base block 2b is substantially flash with the bottom of the chassis 34, the signal terminals projecting from the base block can be directly soldered to the circuit board 35 installed on the chassis 34.

Figure 8:
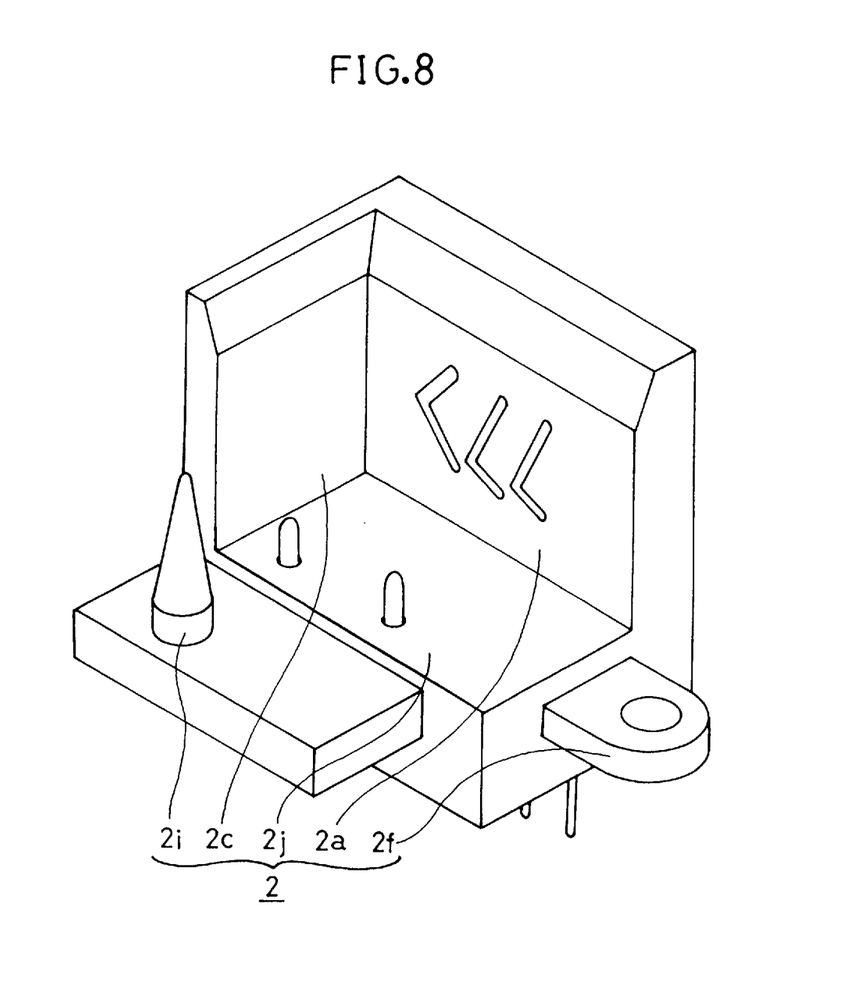
FIG. 8 is a perspective view of a package relay terminal assembly according to a third embodiment of the invention.
Figure 9:
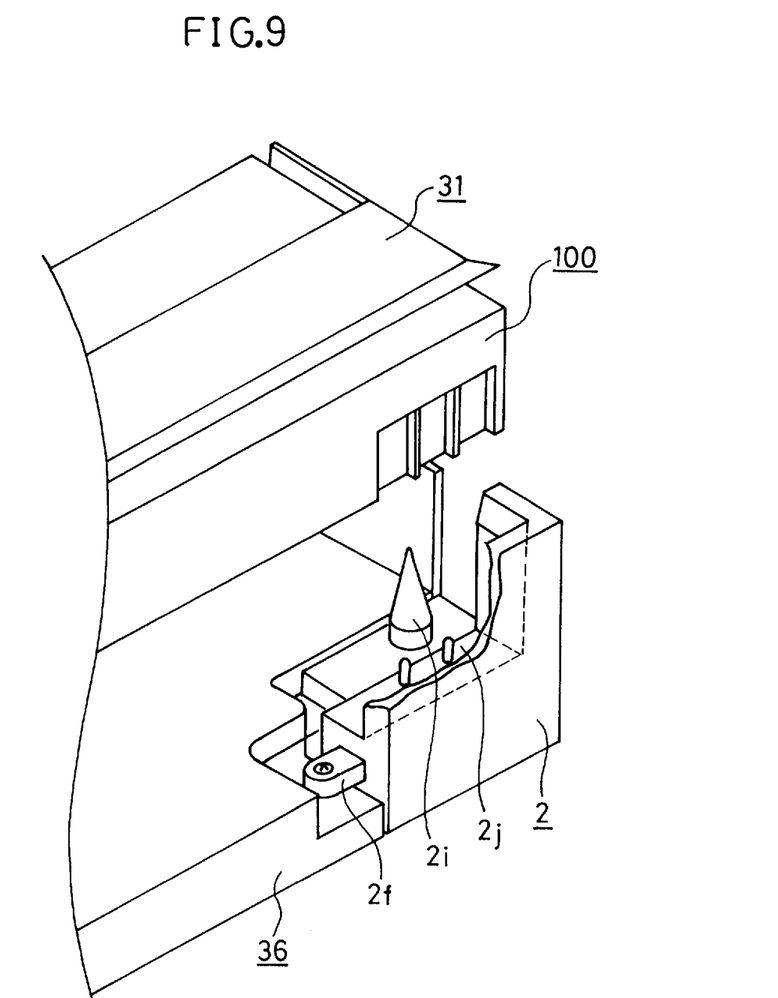
FIG. 9 is a partial perspective view showing how the record package is lifted and lowered in a recording and reproducing device having the package relay terminal assembly attached thereto.

A third embodiment of the invention will now be described with reference to the drawings. FIG. 8 is a perspective view of a package relay terminal assembly according to a third embodiment of the invention, and FIG. 9 is a partial perspective view, partly broken away, showing a record package being set in place in a recording and reproducing device having said package relay terminal assembly.

In FIG. 8, denoted by 2i is a positioning projection, which is a taper pin of synthetic resin erected laterally of a base block 2j and is integral with a terminal body 2. This positioning projection 2i is inserted in a positioning hole in the record package to position the latter. The rest of the arrangement is the same as in the second embodiment.

How to assemble the package relay terminal assembly of the third embodiment on the chassis and how it operates will now be described. In FIGS. 8 and 9, the package relay terminal assembly is fixed at a corner of the chassis of the recording and reproducing device by a fixing portion 2f. Thereby, as in the case of the second embodiment, the force with which the terminal strips 1 press the exterior connection terminals 101 when the record package 100 is set in place on the chassis, is increased and conduction becomes more reliable. Further, since the taper pin 2i for positioning the record package is molded of the same synthetic resin as that of the relay terminal body 2, it can be smoothly inserted into the positioning hole in the record package, ensuring smoother setting of the record package and improved accuracy of the positioning of the record package. In addition, the electric circuit is the same as that for the second embodiment shown in FIG. 7.

Thus, according to the package relay terminal assembly of the third embodiment, in addition to the arrangement of the second embodiment, at least one projection 2i of synthetic resin is provided on the base block 2j, so that the projection 2i can be smoothly inserted into the positioning hole in the record package, ensuring smoother setting and improved accuracy of the positioning of the record package.

In addition, in the first embodiment, the exterior connection terminals 101 of the record package have been shown three in number and so have been the terminal strips 1 of the package relay terminal assembly; however, it goes without saying that they are not limited to this number. Further, the terminal strips are led from the terminal wall interior via the base block to the base block bottom; however, the invention is not limited to this arrangement and they may be led out from the back of the terminal wall 2a.

Further, in the second embodiment, the terminal strip closest to the guide wall has been shown to be the main terminal strip 1a; this results from the design in which of the terminal strips the one opposed to the main exterior connection terminal 101a is set as the main terminal strip 1a; the main terminal strip may be located at any position provided it is opposed to the main exterior connection terminal.

Particularly, an arrangement may be made in which the exterior connection terminals of the record package are four in number, the main exterior connection terminal being grounded, the other terminals being a power terminal, a clock signal terminal, and a data signal terminal, with a nonvolatile memory contained in the record package. In this arrangement, if the main terminal strip is located so that its bending place opposed to the ground is above the level of those of the other terminals, then the connection to the ground is first made during the insertion of the record package and during the discharge thereof the connection to the ground remains longer than the other auxiliary terminal strips. Therefore, it has a greater advantage from the standpoints of protection of the memory element and the reliability of the data transmission and reception.

Further, in the second and third embodiments, the switches have been described as two in number, but they may be three or more. In the second embodiment, the first switch is of the normally closed type (normally the switch is closed and opened when pushed), and in the third embodiment it is of the normally open type (normally the switch is open and closed when pushed); thus, whichever switch type is selected will do.

Besides, in all embodiments, a record package of magnetic tape has been shown as an example of a recording medium, a record package of optical disk will provides the same results. Further, the number of settings shown in Table 3 is not limited to three, and four or more settings are, of course, possible by employing a suitable layout of resistance values.

What is claimed is:

1. A package connect terminal assembly used in a recording and reproducing device for recording and reproducing data on and from a record package having a recording medium for magnetic or optical recording and reproduction, said package connect terminal assembly also having an electric circuit that connects with an electric circuit of the record package, said package connect terminal assembly comprising:
   a terminal wall;
   at least two electrically conductive terminal strips attached to said terminal wall that are electrically connectable to exterior connection terminals of the record package;
   a base block fixed on a chassis and being substantially perpendicular to said terminal wall; and
   a guide wall substantially perpendicular to both said terminal wall and said base block, so that said guide wall protects said terminal wall from damage as the record package is guided downward against said guide wall to electrically connect the exterior connection terminals of the record package with said conductive terminal strips of said terminal wall.

2. A package connect terminal assembly as set forth in claim 1, further comprising a switch provided on said base block, said switch comprising a switch pin at a front end that protects out of said base block.

3. A package connect terminal assembly as set forth in claim 1, wherein said terminal strips are bent in an L-shape, said terminal strips being disposed on said terminal wall and in parallel with said base block, one of said terminal strips being a main terminal strip that has a bending position located farther away from the base block than the bending positions of the other of said terminal strips.

4. A package connect terminal assembly as set forth in claim 3, wherein said main terminal strip has a greater area of contact with one of the exterior connection terminals than other said terminal strips have with other respective exterior connection terminals.

5. A package connect terminal assembly as set forth in claim 3, wherein said main terminal strip and a signal terminal of one of the switches disposed on the base block conduct to each other.

6. A package connect terminal assembly as set forth in claim 1, wherein at least one retaining hole is formed in one of a group selected from said base block and a positioning portion formed in said base block, the retaining hole receiving a projection for positioning the record package.

7. A package connect terminal assembly as set forth in claim 1, wherein at least one projection is provided in said base block, said projection being adapted to fit in at least one positioning hole formed in the bottom surface of the record package.

8. A package connect terminal assembly as set forth in claim 1, wherein when the package connect terminal assembly is attached to said chassis of the recording and reproducing device, the bottom surface of said chassis being substantially flush with the bottom surface of said base block.

9. A recording and reproducing device for recording and reproducing data on and from a record package having a recording medium for magnetic or optical recording and reproduction and also having an electric circuit, said recording and reproducing device comprising:
   a chassis;
   means for raising and lowering the record package from a position above said chassis to a position on said chassis;
   a tapered positioning pin protruding from said chassis, in a substantially perpendicular direction, so that said tapered positioning pin fits within a substantially circular positioning hole formed in a bottom surface of the record package to stabilize the position of the record package on said chassis; and
   a package connect terminal assembly comprising at least two electrically conductive terminal strips that conduct to exterior connection terminals of the record package, a terminal wall having the terminal strips fixed thereon, a base block fixed on said chassis and being substantially perpendicular to the terminal wall, and a guide wall being substantially perpendicular to both of said terminal wall and said base block and so that said guide wall protects said terminal wall from damage as the record package is guided downward against said guide wall toward said chassis to electrically connect the record package with the conductive terminal strips of said terminal wall.

10. A recording and reproducing device for recording and reproducing data on and from a record package having a recording medium for magnetic or optical recording and reproduction and also having an electric circuit,
    said recording and reproducing device comprising:
    a chassis;
    means for raising and lowering the record package from a position above said chassis to a position on said chassis;
    a tapered pin protruding from said chassis in a substantially perpendicular direction so that said tapered pin fits within a substantially circular positioning hole formed in a bottom surface of the record package to stabilize the position of the record package on said chassis; and
    a package connect terminal assembly comprising at least two electrically conductive terminal strips that conduct to exterior connection terminals of the record package, a terminal wall having said terminal strips fixed thereon, a base block fixed on said chassis and being substantially perpendicular to said terminal wall, and a guide wall being substantially perpendicular to both of said terminal wall and said base block so that said guide wall guides and positions the record package during placement onto said chassis and during connection of the exterior connection terminals of the record package with said terminal strips of said terminal walls.

11. A recording and reproducing device as set forth in claim 10, wherein the package connect terminal assembly includes a pin erected on the base block substantially perpendicular thereto, and a switch for detecting whether the pin is pressed downward.

12. A package connect terminal assembly as set forth in claim 10, wherein said terminal strips are bent in an L-shape, said terminal strips being disposed on said terminal wall and in parallel with said base block, one of said terminal strips being a main terminal strip that has a bending position located farther away from the base block than the bending positions of the other said terminal strips.

13. A package connect terminal assembly as set forth in claim 12, wherein said main terminal strip of the package connect terminal assembly has a greater area of contact with one of the exterior connection terminals than other said terminal strips have with other respective exterior connection terminals.

14. A package connect terminal assembly as set forth in claim 13, wherein said main terminal strip of the package connect terminal assembly and a signal terminal of one of the switches disposed on said base block conduct to each other.

15. A package connect terminal assembly as set forth in claim 10, wherein at least one retaining hole is formed in one of a group selected from the base block and a positioning portion formed in said base block, said retaining hole receiving a tapered projection for positioning the record package.

16. A package connect terminal assembly as set forth in claim 10, wherein at least one tapered projection is provided in said base block, said projection being adapted to fit in at least one positioning hole formed in the bottom surface of the record package.

17. A package connect terminal assembly as set forth in claim 10, wherein when the package connect terminal assembly is attached to said chassis of the recording and reproducing device, the bottom surface of said chassis being substantially flush with the bottom surface of said base block.

* * * * *